United States Patent

[11] 3,621,979

| [72] | Inventor | Robert W. Kraeft |
| | | 59 Colonial Road, Emerson, N.J. 07630 |
| [21] | Appl. No. | 781,480 |
| [22] | Filed | Dec. 5, 1968 |
| [45] | Patented | Nov. 23, 1971 |

[54] MAGNETIC CONVEYOR SYSTEM
1 Claim, 4 Drawing Figs.

[52] U.S. Cl. .................................................... 198/41, 198/203
[51] Int. Cl. ...................................................... B65g 17/46
[50] Field of Search .......................................... 198/41, 202, 203, 204, 137

[56] References Cited
UNITED STATES PATENTS

| 2,007,910 | 7/1935 | Stephens | 198/203 |
| 2,609,915 | 9/1952 | De Burgh | 198/41 |
| 3,474,892 | 10/1969 | Spodig | 198/41 |

Primary Examiner—Evon C. Blunk
Assistant Examiner—Alfred N. Goodman
Attorney—Mawhinney & Mawhinney ABSTRACT: This disclosure pertains to a conveyor system which is primarily designed for use in volume feeding operations where the trays and soiled dishes are returned to the dish room by means of a conveyor, such as schools, hospitals, in-plant feeding and military installations, and in which a magnetic couple is provided between a conveyor and the material to be moved by the conveyor. One element of the magnetic couple is carried by the conveyor and the second element of the couple is mounted on a receptacle in which the material is placed.

INVENTOR
ROBERT W. KRAEFT

BY Mawhinney & Mawhinney

ATTORNEYS

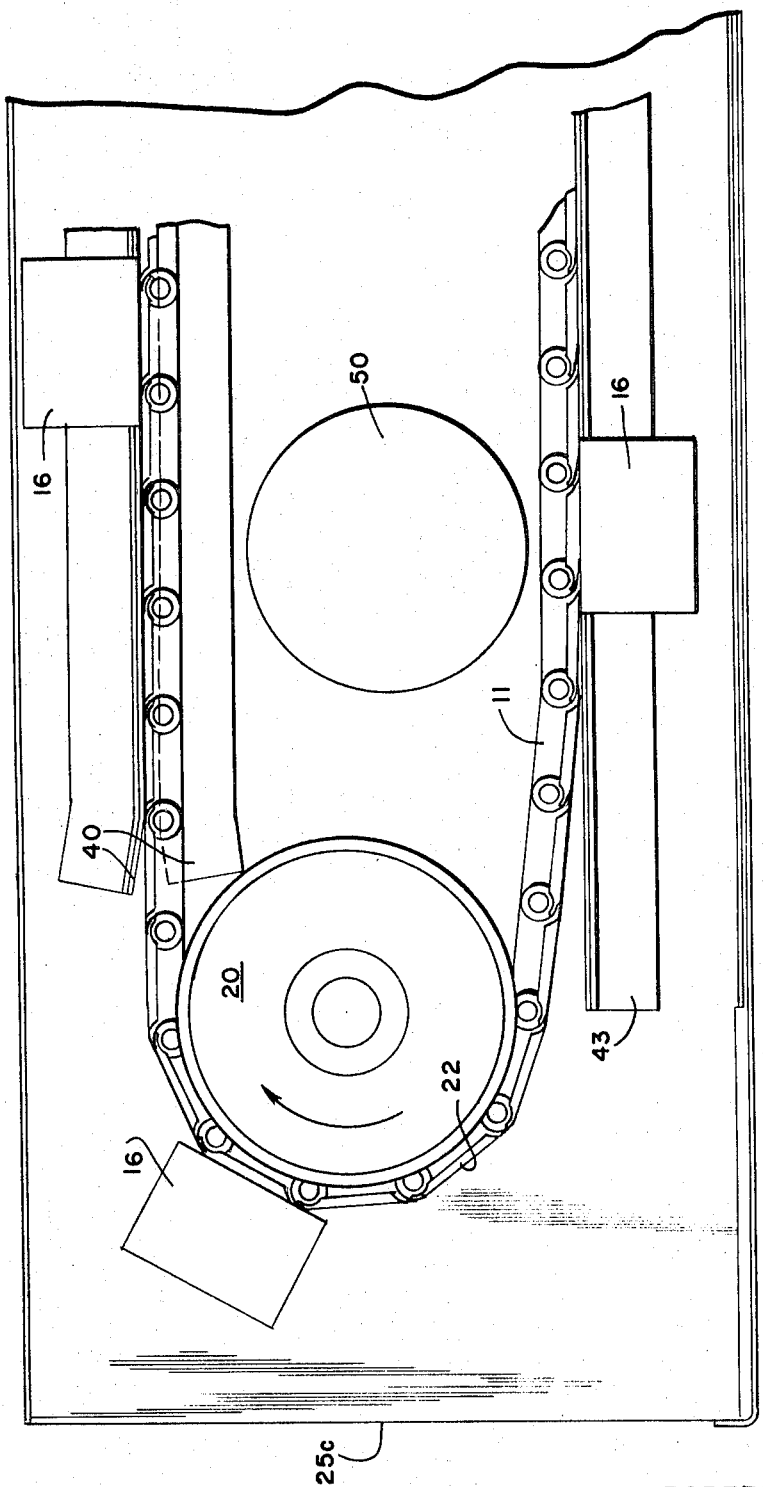

MAGNETIC CONVEYOR SYSTEM

The present invention relates to a conveyor system and has for an object the provision in such a system of a magnetic couple one element of which is carried by the conveyor and the second element is carried by the receptacle to be moved by the magnetic force.

Another object of the present invention is to provide an improved endless conveyor in which the said one element is in the form of a permanent horseshoe magnet and means for mounting the magnet on one or more of the links of the conveyor so that the poles of the magnet extend outwardly of the endless conveyor so that the endless conveyor offers no interference to the lines of force or flux of the magnet.

A further object of the invention is to provide an apparatus of the kind in which the second element in the form of an armature is molded into the receptacle which is made of nonmagnetic material so that the armature is exposed without interference to the magnetic force of the magnet.

The present invention aims to provide an apparatus of this type in which means are provided for mounting the receptacle in proper oriented position on a supporting structure above the conveyor so that the armature on the receptacle will be retained in proper cooperating relation to the magnet on the conveyor as the conveyor moves with respect to the mounting means.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIG. 3 is a side elevational view partly in section and with parts broken away of the left-hand portion of the device showing the idler pulley assembly.

Figure 1:
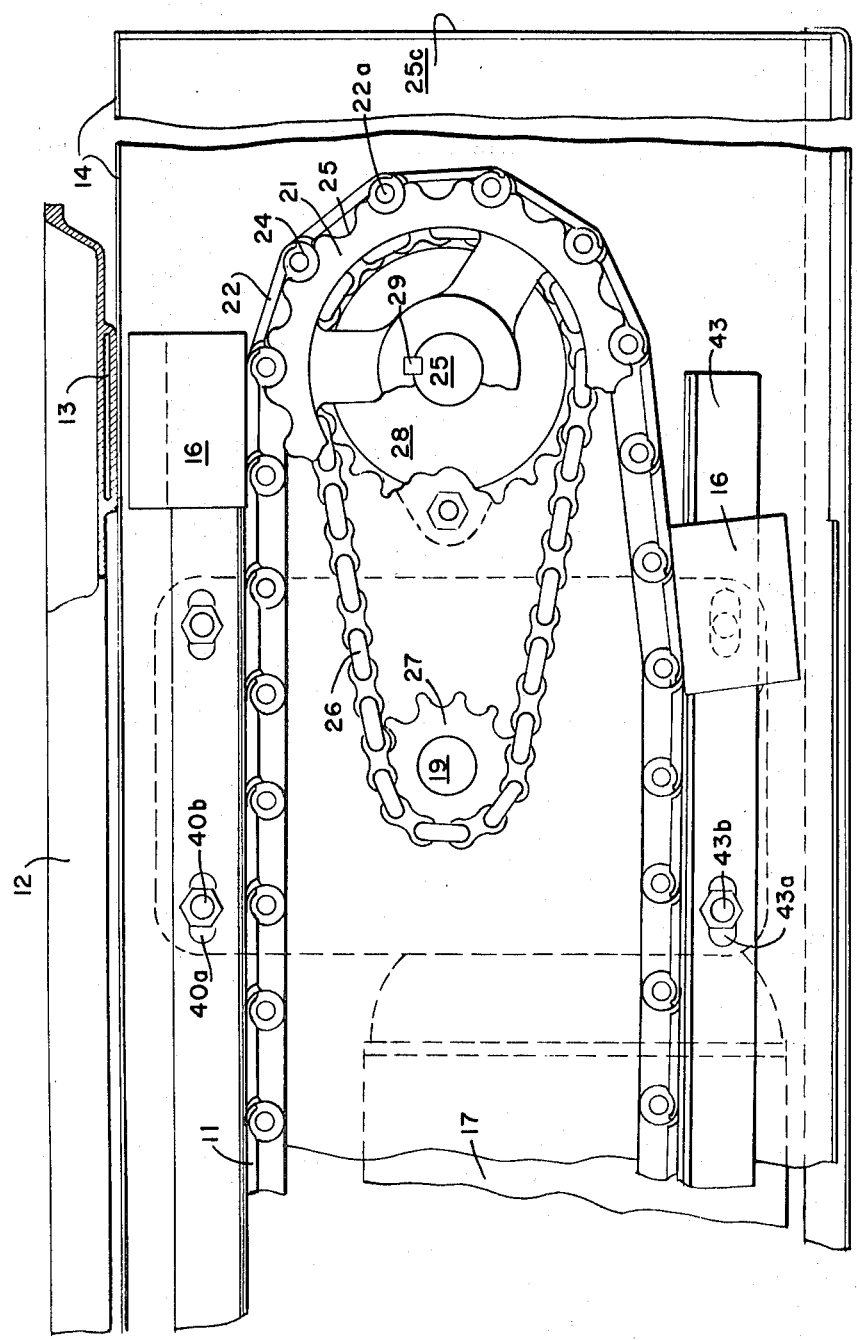
FIG. 1 is a side elevational view partly in section and with parts broken away of the right-hand portion of the device showing the drive assembly.
Figure 2:
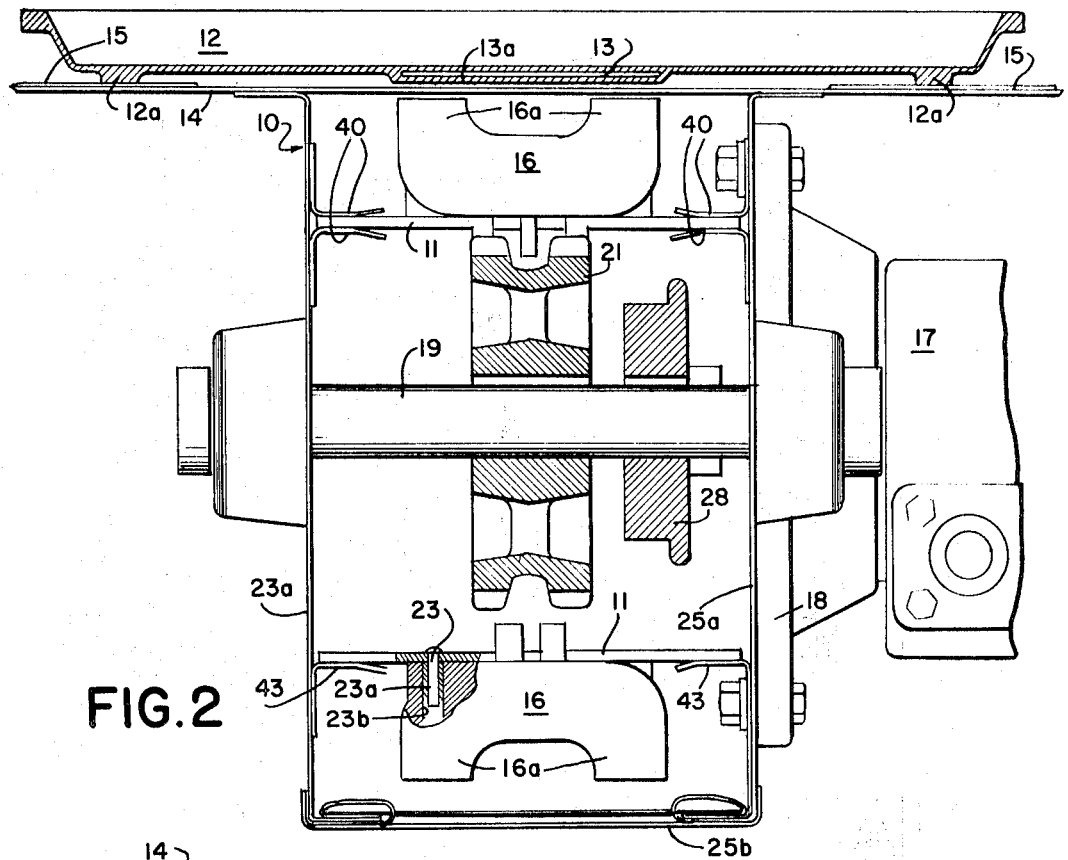
FIG. 2 is an end elevational view partly in section and with parts broken away of the drive assembly.
Figure 4:
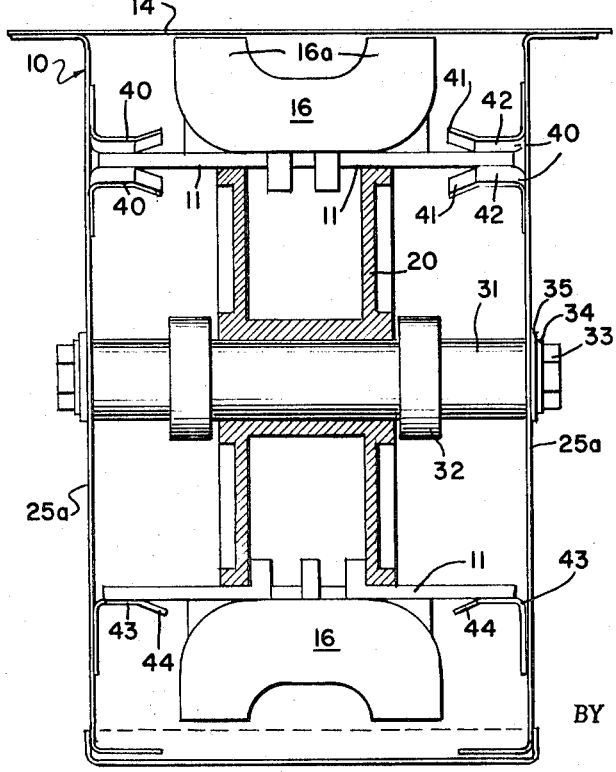
FIG. 4 is an end elevational view partly in section of the idler pulley assembly.

Referring specifically to the drawings, a suitable housing or supporting framework is provided at 10 on which is supported a table top 14 and in which the upper run of an endless table top conveyor 11 travels in a horizontal path in close proximity to and below the top 14 of said structure 10 to convey (aided by permanent magnet action) material along said table top, for example, cutlery arranged in trays or receptacles 12.

Said trays or receptacles 12 of suitable shape and made of any suitable nonmagnetic material, preferably of fiber glass or bakelite or similar material with one or more metallic armatures or keeper plates 13 received by a recess 13a formed in he bottom of each receptacle at substantially the center thereof. The magnetic keeper 13 is molded into the tray 12 so that it is completely covered by the tray material of fiber glass or bakelite, and this is one of the important features of this invention. Fastened to the structure 10 is the table top 14 which is made of a nonmagnetic material, for instance 300 series stainless steel which carries slide strips 15 to afford spaced apart tracks over which the receptacles move with minimum friction. The slide strips are made of nonmagnetic material, such as nylon, delrin or similar material. The trays 12 are provided with feet 12a which slide over the strips 15 as the magnetic force draws the trays along over the table top 14.

Reverting to the endless conveyor 11, it carries one or more magnets 16 of suitable strength and usually of the horseshoe permanent type so that as the conveyor is moved the magnets attract the armatures or keeper plates 13 of the receptacles 12 to hold and move the receptacles successively along the table top until finally the magnets 16 move downwardly out of magnetic relation to the keeper plates or armatures for return movement on the lower run of the conveyor to position on the upper run of the conveyor to attract the keeper plate 13 of another receptacle or tray 12.

A suitable source of power, such as an electric motor unit 17 suitably mounted on structure 10, drives the endless conveyor or chain 11. Through conventional speed reducer mechanism 18 the motor operates a drive shaft 19.

The chain or endless conveyor 11 is mounted by an idler wheel 20 and a sprocket wheel 21 carried by the framework 10 and consists of suitable links 22 pivotally connected by pintles 22a engaged in inwardly extending rounded barrels 24 which fit the depressions 25 in the peripheral portions of the sprocket wheel 21 to effect or enable the desired movement of the endless chain 11.

It will be noted that one or more of the magnets 16 are employed, each being fastened to a selected link 22 of the conveyor chain 11 with the poles 16a of the magnets extending outwardly of the conveyor chain 11. Specifically the magnets may be fastened to the links 22 by pop rivets 23, if desired, which extend into tubular sleeve magnet inserts 23a of insulating material which are received by recesses 23b formed in he magnets 16. The tubular sleeve insert 23a around the pop rivet is pressed into place to provide a total thickness not beyond that of a standard or conventional pop rivet.

A shaft 25, journaled in sidewalls 25a of the table housing 10, is driven by means of a sprocket chain 26 passing over a sprocket 27 keyed to shaft 19 and over a sprocket 28 keyed to shaft 25. The endless conveyor 11 is trained over the sprocket wheel 21 which is keyed at 29 to shaft 25. Conveyor chain 11 is trained over the idler wheel 20 which is of the same size as wheel 21 and is mounted on a stub shaft or idler wheel shaft 31 by a set collar 32. The shaft 31 is fastened to structure 10 by a screw 33, lockwasher 34 and washer 35.

The shafts 19 and 25 are journaled in conventional bearings and seals carried by the sidewalls 25a of the framework structure 10.

Presuming use with motor unit 17 in operation, the endless conveyor chain 11 through the gearing specifically traced above, moves its upper run parallel to and sufficiently close to table top 14 that the magnets 16 will successively attract the keeper plates or armatures 13 of the receptacles 12 in proper proximity thereto. Thus the trays or receptacles which are being or have been filled and contain articles such as cutlery, glassware and china, and are in position on the table top 14, will be moved along the table top and at any time or position can be discharged or manually removed from the table top. The magnetic attraction of the armatures 13 by the magnets 16 will be overcome as the upper run of the endless chain 11 moves downwardly and returns to upper-run position.

It will be noted that although the conveyor belt 11 and the magnets 16 do not come into contact with the trays since they are concealed under the table, the poles 16a of the magnets 16 extend outwardly of the conveyor chain 11 and that the receptacles are supported by the table top 14 which is made of nonmagnetic material so that there is no interference with the magnetic field or flux of the magnets 16 and their armatures 13. The provision of the slide strips 15 carried by the table top 14 in spaced apart relation and the fact that the armatures 13 are located substantially centrally of the receptacles will assure that the receptacles slide smoothly in properly oriented position over the table top 14 without any likelihood of the receptacles becoming disarranged on the table top so that the armatures 13 will always be disposed in the magnetic field of the magnets 16.

At 40 are shown a pair of guides for the upper run of the conveyor belt 11 which are carried by the sidewalls 25a of the framework 10. It will be noted that these guides are flared at 41 in a direction widthwise of the chain 11 and are also flared as at 42 in a direction opposite to the direction of movement of the chain 11 so as to facilitate the entrance of the chain 11 into the guides 40 and to retain and support the chain 11 therein. The uppermost of the guides 40 prevent the upper run of the chain from bulging upwardly. The guides 40 may be adjusted by means of slots 40a formed in the guides and bolts 40b received by suitable openings in the sidewalls 25a.

Guides 43 are carried by the sidewalls 25a of the framework 10 for supporting the lower run of the chain 11. The guides 43 are flared as at 44 in a direction widthwise of the chain 11. The guides 43 may be adjusted by slots 43a and bolts 43b similar to slots 40a and bolts 40b.

It will be noted that there are no moving parts visible, such as conveyor belts, chains or pins. For purposes of access for assembly and maintenance of the device, access openings 50 are provided for the sidewalls 25a which may be spaced apart approximately 2 feet. The moving parts are enclosed by the sidewalls 25a, the table top 14 and a bottom 25b. The ends of the housing 10' are closed by end walls 25c.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:
1. In a conveying system
   a. a conveyor,
   b. an element of a magnetic couple affixed to and moving with the conveyor,
   c. a receptacle for articles to be transported by the conveyor,
   d. a second magnetic element complementary to the first element affixed to the receptacle,
   e. the force of the magnetic attraction between the elements acting to hold the receptacle to the conveyor and entrain the receptacle to move with the conveyor, said receptacle being made of a moldable nonmagnetic material and the second element being molded into said receptacle so that the second element is completely covered by the moldable nonmagnetic material.

* * * * *